United States Patent [19]
Smith

[11] Patent Number: 5,826,300
[45] Date of Patent: Oct. 27, 1998

[54] VACUUM CLEANER ACCESSORY

[76] Inventor: Arthur Shawn Dwight Smith, R.R. #3, Mouth of Keswick, New Brunswick, Canada, E0H 1N0

[21] Appl. No.: 869,482

[22] Filed: Jun. 5, 1997

Related U.S. Application Data

[63] Continuation-in-part of Ser. No. 529,451, Sep. 18, 1995.
[51] Int. Cl.[6] .................................................. A47L 9/06
[52] U.S. Cl. ................................. 15/402; 15/396
[58] Field of Search .............................. 15/401, 402, 398, 15/397

[56] References Cited

U.S. PATENT DOCUMENTS

| | | | |
|---|---|---|---|
| 3,209,386 | 10/1965 | Weber | 15/344 |
| 3,574,885 | 4/1971 | Jones | 15/393 |
| 3,668,736 | 6/1972 | Loscalzo | 15/402 |
| 3,955,238 | 5/1976 | Remijas | 15/402 |
| 4,190,924 | 3/1980 | Nicholson | 15/402 |
| 4,218,806 | 8/1980 | Cohn | 15/402 |
| 4,279,095 | 7/1981 | Aasen | 15/397 X |
| 4,343,265 | 8/1982 | Belschner | 119/83 |
| 5,074,006 | 12/1991 | Eremita | 15/344 |
| 5,211,131 | 5/1993 | Plyler | 119/87 |
| 5,502,873 | 4/1996 | Hogan | 15/393 |
| 5,655,257 | 8/1997 | Chavez | 15/402 X |

*Primary Examiner*—Chris K. Moore
*Attorney, Agent, or Firm*—Lynn S. Cassan

[57] ABSTRACT

A multi-purpose vacuum cleaner accessory is provided for use in grooming multiple types of animals and for cleaning fabric and flooring substrates. The accessory comprises a body and a brush attachable thereto. The brush is configured for creating an airflow directed to the surface of the animal's coat or substrate so that the brush is effective for use on all types of animal coats and fabrics/flooring. The brush comprises a circumferential, downwardly-extending skirt and a plurality of cross-members extending inwardly from sides of said brush and joining together in the interior thereof. The skirt and cross-members have a plurality of downwardly-projecting, spaced teeth wherein the teeth are comprised of a thermoplastic material having a relatively high co-efficient of friction to adhere to loose hair to be suctioned (preferably, a durometer reading of Shore A65) and sufficient strength for said brush to achieve brushing action. The length of the teeth being in the range 4–10 mm, a length of 6 mm being preferable, and the ratio between the area of said teeth and the spacing between said teeth is preferably 1:1.

8 Claims, 7 Drawing Sheets

FIG. I

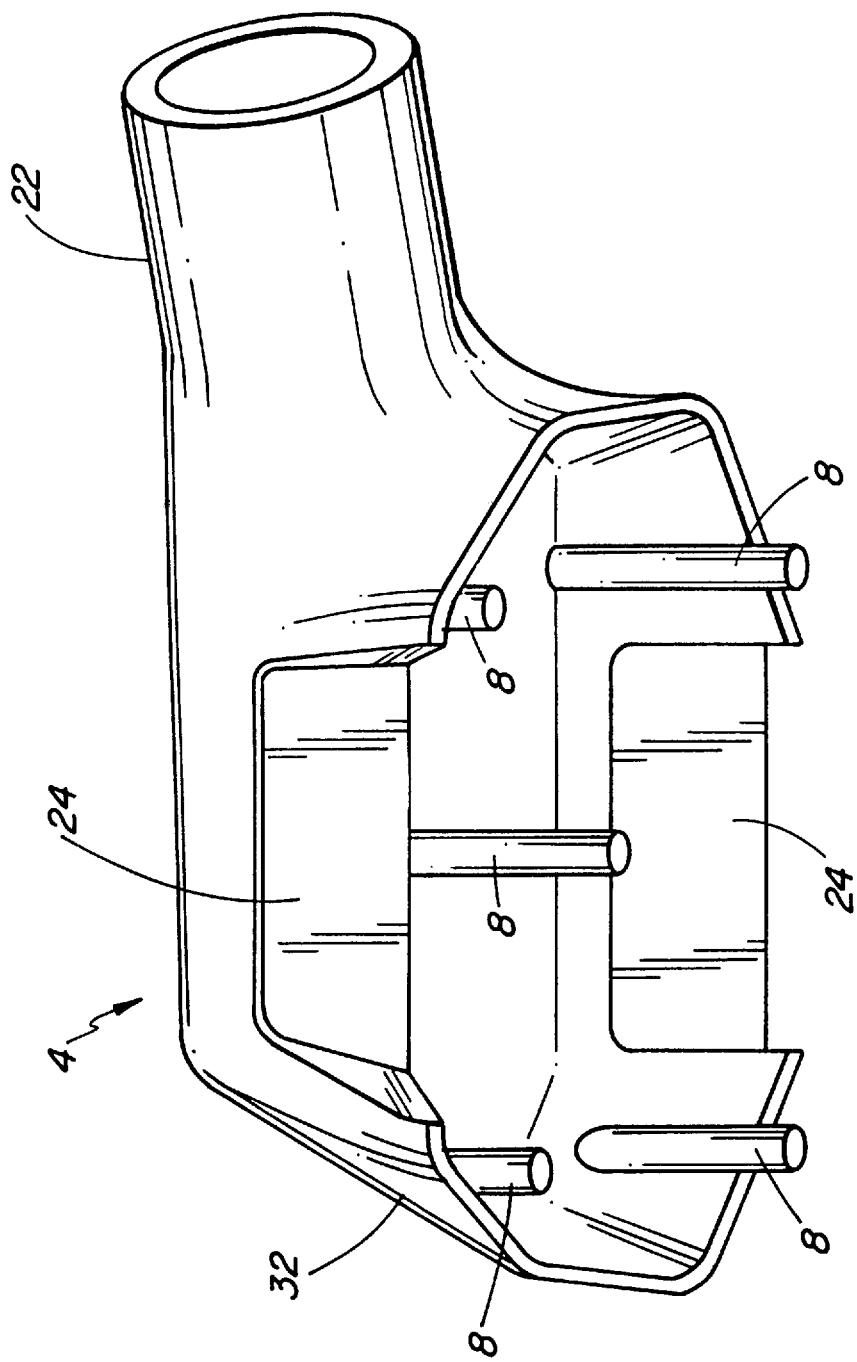

VACUUM CLEANER ACCESSORY

RELATED APPLICATION

This application is a continuation-in-part application of application Ser. No. 08/529,451 filed 18 Sep., 1995.

FIELD OF THE INVENTION

The invention is a multi-purpose, surface-active, vacuum cleaner accessory for effective removal of loose pet hair and associated debris from animals of various types (and having any of a variety of coat types) and also from substrates such as upholstery, clothing, carpeting and bedding.

BACKGROUND OF THE INVENTION

There are a large number of curry combs and brushes for grooming animals that are commercially available. Some of these grooming tools have been adapted for attachment to a vacuum machine. Devices of this type are shown, for example, in U.S. Pat. Nos. 5,211,131 (Plyler), 5,502,873 (Hogan), 4,218,806 (Cohn), 4,190,924 (Nicholson), 3,955,238 (Remijas) and 3,574,885 (Jones). However, none of these prior art devices is effective as a multi-purpose vacuum cleaner accessory, for use on a variety of types of animal coats and fabric/flooring substrates, because each is intended for grooming pets and is configured to be operative at the surface of the animal's skin using a combing action which passes by and through the hair shafts to the skin surface. Such a combing action requires a long enough tooth length to penetrate the animals coat to the skin surface and such a length, while suitable for a given thickness of animal coat, would not be suitable for fabric or flooring substrates or for short-haired pets because the resulting airflow pattern created by such a configuration would mostly bypass the surface of the substrate or short-haired pet. Consequently, the prior art devices must be differently configured for use on any given type of pet or substrate if they are to be effective for removal of hair and debris therefrom. A further deficiency presented by some prior art devices is excessive suction pressure on the surface being vacuumed.

SUMMARY OF THE INVENTION

The invention provides a vacuum cleaner accessory and accessory brush for efficiently removing loose hair and associated debris from a variety of animal types and substrates including fabric and flooring.

The brush is configured for attachment to a body having a nozzle for attachment to a vacuum source and for creating an airflow directed to the surface of the animal's coat or substrate. The brush comprises a circumferential, downwardly-extending skirt and a plurality of cross-members extending inwardly from sides of the brush and joining together in the interior thereof. The skirt and cross-members have a plurality of downwardly-projecting, spaced teeth wherein the teeth are comprised of a thermoplastic material having a relatively high co-efficient of friction to adhere to loose hair to be suctioned yet sufficient strength for the brush to achieve brushing action. The length of the teeth is in the range 4–10 mm and the ratio between the area of the teeth and the spacing between the teeth is in the range 1:1 to 1:2.

Preferably the teeth are molded of an elastomer-based rubber having a durometer reading between Shore A47 and Shore D63. The shape of the teeth is preferably triangular and four-sided, the depth and width thereof being the same. In the preferred embodiment the teeth are 6 mm long and said ratio is 1:1.

BRIEF DESCRIPTION OF THE DRAWINGS

In drawings which illustrate a preferred embodiment of the invention,

FIG. 8 is a perspective view of the underside of the body.

DETAILED DESCRIPTION OF THE PREFERRED EMBODIMENT

The vacuum accessory device comprises two components, a body 4 and a brush 2 that are assembled together to form the accessory.

Figure 1:
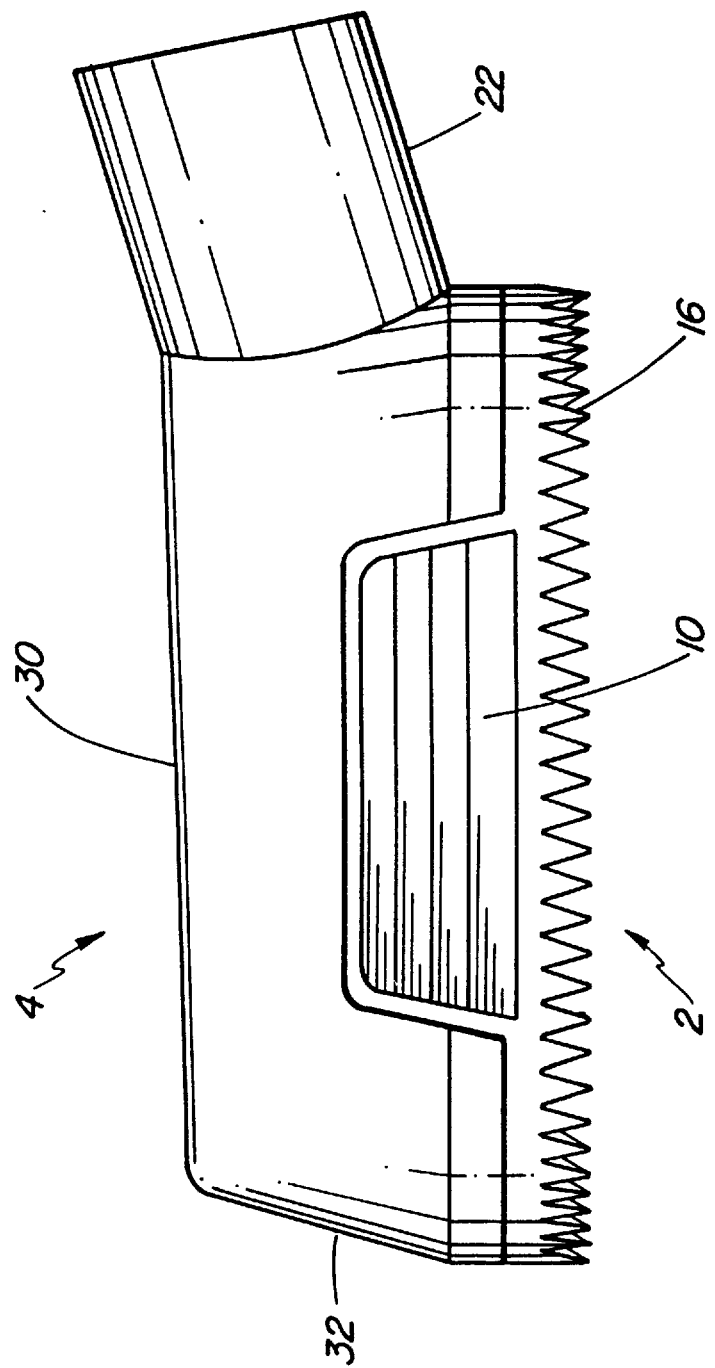
FIG. 1 is a side view of the assembled brush and body.
Figure 2:
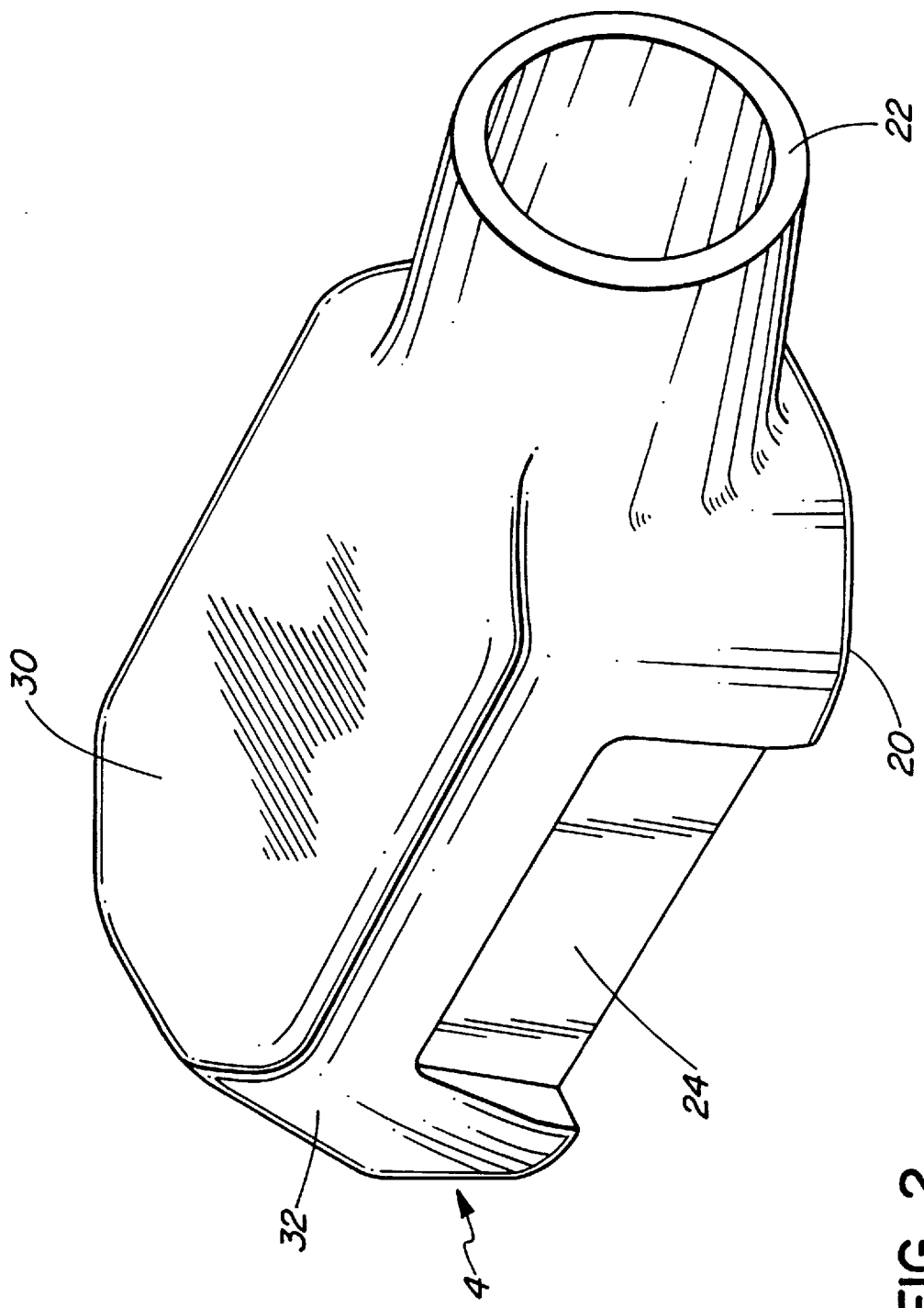
FIG. 2 is a perspective view of the body.

Referring to FIGS. 2 and 8, the body 4 has a generally flat back 30 and downwardly-projecting sides 32 terminating in a lower edge 20. A tubular nozzle 22 extends from one end of the body for attachment to a vacuum hose. The nozzle 22 opens into a chamber formed by the sides and back of the body 4. An adaptor (not shown) may be provided to connect nozzle 22 to any particular size and configuration of vacuum hose, if necessary. The long sides of the body each have an indented section (recess) 24 which provides a seat for mating handgrips on the brush, as discussed below. Five spaced pins 8 project downwardly from the underside of the body 4 for engagement with the brush.

Figure 3:
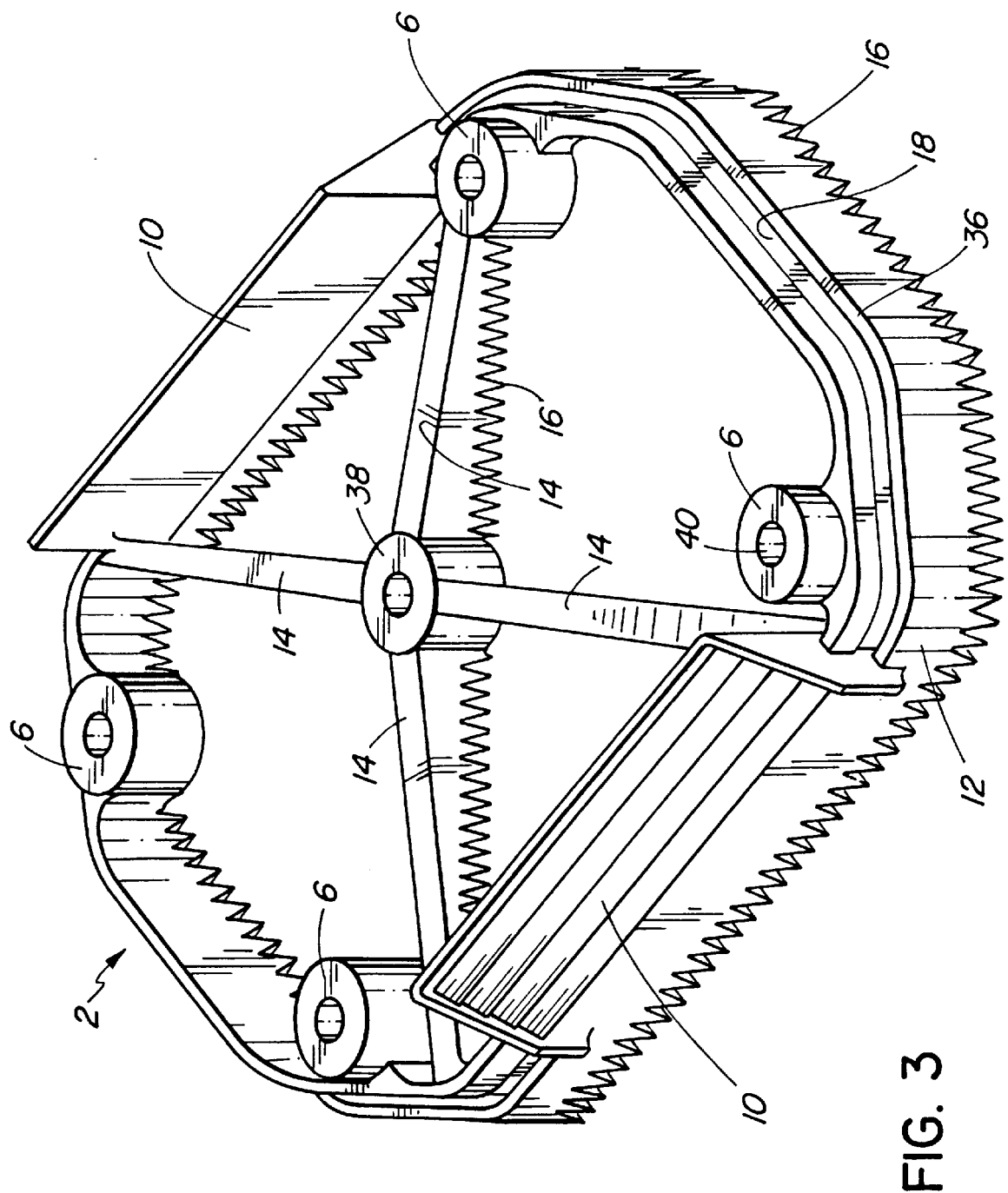
FIG. 3 is a perspective view of the brush.
Figure 5:
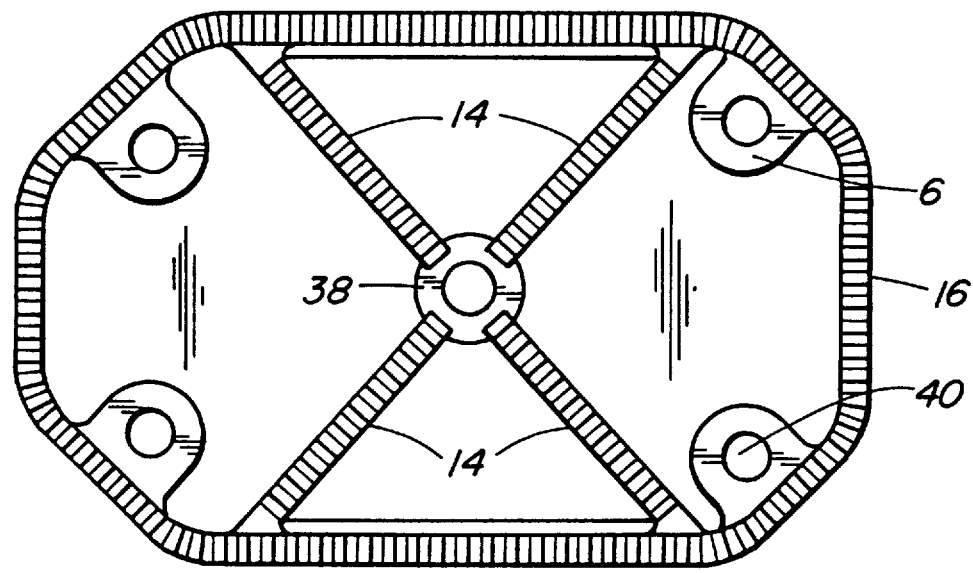
FIG. 5 is the bottom view of the brush.
Figure 6:
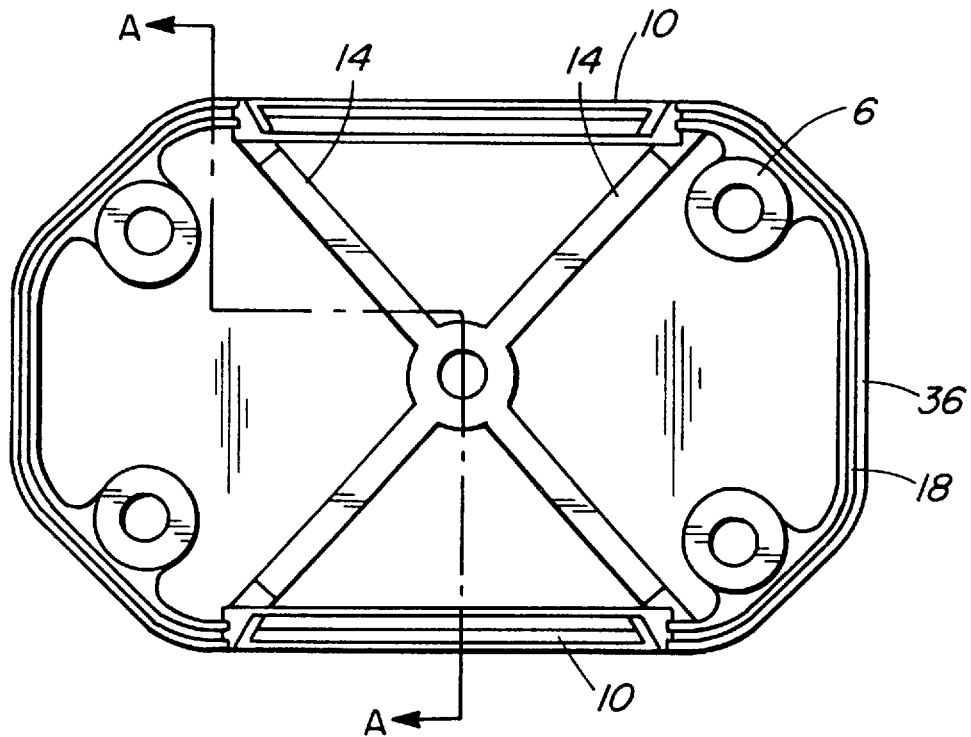
FIG. 6 is a top view of the brush.
Figure 7:
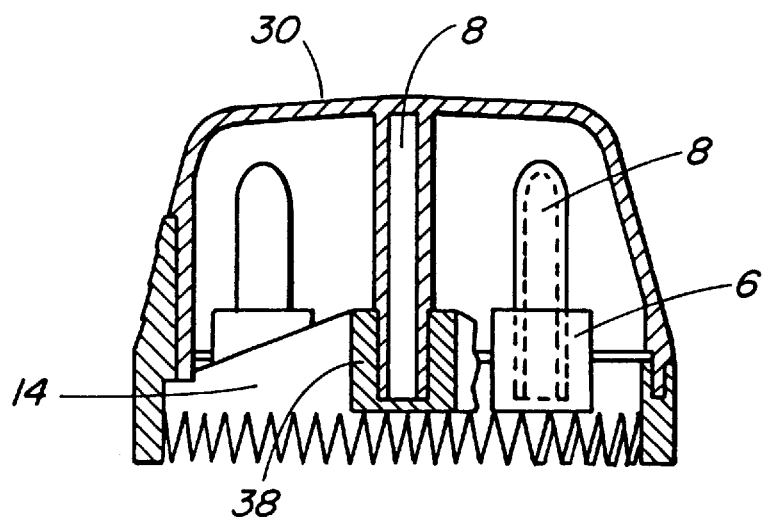
FIG. 7 is a section view on the line VII—VII of FIG. 6, showing the assembled body and brush.

Referring to FIGS. 3, 5 and 6, the brush 2 comprises a circumferential skirt 12. Groove 18 on the upper surface of the skirt 12 snugly receives a lower edge 20 of the body 4 when the brush and body are assembled. The brush 2 has four cross-members 14 extending from the corners of the skirt 12 and joining at the center at boss 38. There are four other bosses 6 at each of the corners of the brush. The bosses 4 and 38 have bores 40 therein to receive the pins 8 of the body 4 when the brush and body are assembled.

The skirt 12 and cross-members 14 have a plurality of closely-spaced triangular teeth 16 on their lower surface. The teeth are flexible and comprised of a thermoplastic material having a sufficiently high co-efficient of friction to feel "sticky" (i.e. to cling to something passing over it) and thereby adhere to loose hair to be suctioned but still have sufficient strength to enable the teeth to achieve a brushing action without collapsing. Hard or brittle plastics which are smooth and non-sticky have low coefficients of friction and are not useful for the present invention.

It is the unexpected discovery of the inventor that an air flow pattern which is directed at the surface of the coat of the animal or substrate rather than the skin surface of the animal, coupled with teeth having a high enough coefficient of friction to cling (grab onto) hair and other loose debris, is effective to remove loose hair and debris equally from short, long, thick or thin haired animals and fabric or flooring substrates. This contrasts sharply with the prior art animal grooming devices which utilize a combing action to pass through the animal's coat and act upon the skin surface of the animal; such devices necessarily contemplate smooth, non-sticky teeth to permit such a combing action and the teeth, in any given case, may be configured so as to be useful for a certain type of animal coat but they cannot be configured to be effective for all types of animal coats and substrates since such would be dependant on the type of animal coat through which the teeth must pass in order to reach the skin surface.

The teeth 16 of the inventor's brush 2 are specifically configured to: (i) produce a directed air flow over and/or through the top surface of the animal's coat or substrate and minimize bypass airflow (bypass airflow being a wasted, non-cleaning airflow which doesn't pass close enough to the animal's coat or the substrate surface to effectively remove loose hair and debris); and, (ii) provide a maximum surface area and number of edges in order to maximize the friction effect of the selected thermoplastic material of the brush.

Figure 3A:
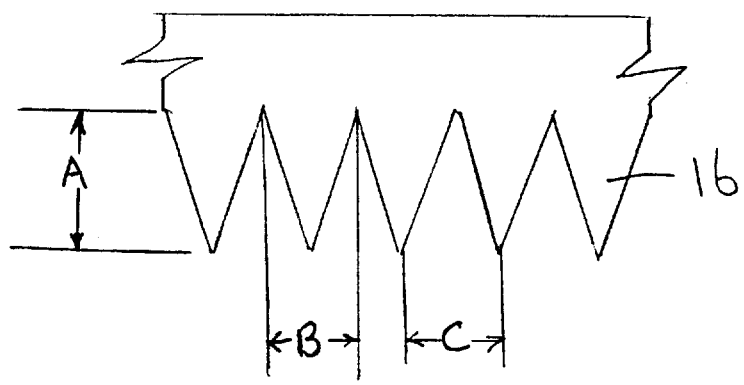
FIG. 3a is a section of a side view of the brush showing the spacing of the teeth.
Figure 3B:
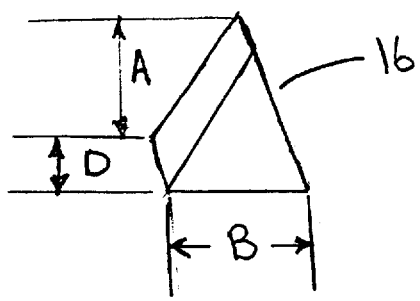
FIG. 3b is a perspective view of one of the teeth of the brush.
Figure 4:
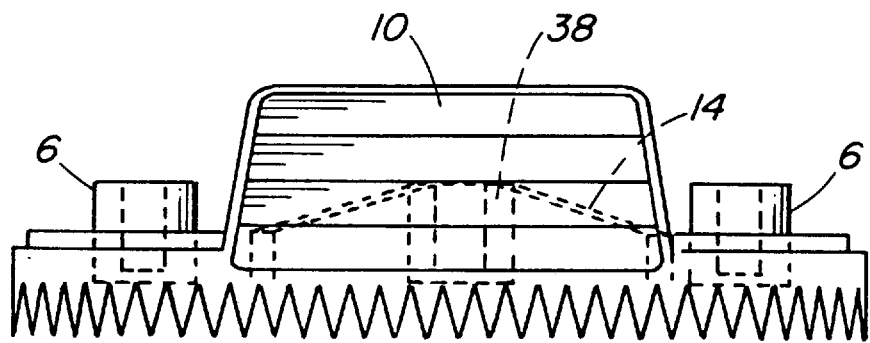
FIG. 4 is the side view of the brush.

The directed airflow is achieved by the inventor's device by means of the relative size, shape and area of both the teeth 16 and the spacing between the teeth. As shown by FIGS. 3a and 3b the teeth 16 are triangular and five-sided, with the width B and depth D at the base being about 4 mm and the length A being about 6 mm. The spacing between the teeth is the same as the area of the teeth themselves such that the ratio between the area of the teeth and the spacing between them is 1:1. If the length of the teeth were to be reduced, or the area of the teeth, it would be appropriate to increase this ratio, up to a maximum of 1:2, in order to maintain optimal surface directed airflow. Although the foregoing tooth dimensions are preferable, a length in the range of 4–10 mm may be used. Lengths over this range would not achieve the desired airflow required by the invention and are not contemplated by the claimed invention. Also, different shapes for the teeth, such as rectangular or cylindrical, could be used but the triangular shape is preferable because it provides about 25% more surface area to utilize the friction (i.e. hair pick-up) effect of the brush material.

The brush 2 has two upwardly-extending flanges 10 which fit into recesses 24 on the body when the brush and body are assembled and serve as handgrips when the accessory is held in a user's hand.

To assemble the brush and body, the flanges 10 are pressed over the recesses 24 to provide a friction grip therewith. As well, the bosses 6, 38 are pushed onto the pins 8 on the body, with which they are a friction fit, until the lower edge 20 of the body seats in groove 18 of the brush.

The body is preferably molded of high impact rigid thermoplastic material such as high density polyethylene (HDPE), polypropylene, acrylonitrile butadiene styrene (ABS), and polycarbonate to resist cracking and breakage.

The teeth of the brush and, preferably, the brush as a whole are molded of an elastomer based rubber (a thermoplastic material) having a sufficiently high co-efficient of friction to cause the teeth to grab onto and pull loose hairs and debris from the animal's coat or substrate yet maintain enough strength (i.e. stiffness) to achieve brushing without the teeth collapsing, so as to maximize hair and dirt removal. The material selected may be a more flexible material having a durometer reading of Shore A47 or a more rigid material having a durometer reading of Shore D63. Such material results in the efficient pulling of dead hair and exposes the hair to the vacuum part of the device for removal. The preferred thermoplastic material for the brush is KRATON G2761 (trademark) having a durometer reading of Shore A65. An additional benefit provided by the flexible elastomer-based rubber teeth is that they then function to pleasantly massage the animal and are non-irritating, in contrast with combs and brushes that have teeth formed from hard plastic or metal. The use of such material for the teeth also permits a flicking action of the teeth as the device is passed over fabric substrate, which projects both hair, skin dander and debris into the air for ready access to vacuum. When used on an animal coat the teeth flex or bend the hair to open the coat for easy vacuum removal of debris between the hair shafts. The thermoplastic material to be used for any particular brush is selected to have a durometer range which is best suited to the specific intended application.

There are two means by which the brush eliminates excessive suction. First, the interior sections defined by the cross-members provide multiple (i.e. four in the embodiment illustrated) separate vacuum compartments. Second, the length and spacing of the teeth are selected to cause the passage of air flow across the teeth, carrying loose hair and debris to the vacuum source.

The accessory is designed to be comfortable and convenient to use. The body is preferably small enough to be easily gripped by the average hand, though it can be made larger for grooming larger animals. The flanges 10 preferably have ridges to permit a firm grip. The nozzle 22 is positioned to minimize interference from the vacuum hose when the accessory is used for grooming an animal.

I claim:

1. A multi-purpose vacuum cleaner accessory brush for use in grooming multiple types of animals and for cleaning fabric and flooring substrates, said brush being configured for attachment to a body having a nozzle for attachment to a vacuum source and for creating an airflow directed to the surface of the animal's coat or substrate, said brush comprising a circumferential, downwardly-extending skirt and a plurality of cross-members extending inwardly from sides of said brush and joining together in the interior thereof, said skirt and cross-members having a plurality of downwardly-projecting, spaced teeth wherein said teeth are comprised of a thermoplastic material having a relatively high co-efficient of friction to adhere to loose hair to be suctioned and sufficient strength for said brush to achieve brushing action, the length of said teeth teeth being in the range 4–10 mm and the ratio between the area of said teeth and the area of the spacing between said teeth being in the range of 1:1 to 1:2.

2. An accessory brush according to claim 1 wherein said teeth are molded of an elastomer-based rubber having a durometer reading between Shore A47 and Shore D63.

3. An accessory brush according to claim 2 wherein said teeth are 6 mm long and said ratio is 1:1.

4. An accessory brush according to claim 1 wherein the shape of said teeth is triangular and four-sided, the depth and width thereof being the same.

5. A multi-purpose vacuum cleaner accessory for use in grooming multiple types of animals and for cleaning fabric and floor substrates comprising:

(a) a body having a back, downwardly-projecting sides and a nozzle for attachment to a vacuum source, and (b) a brush comprising a circumferential, downwardly-extending skirt and a plurality of cross-members extending inwardly from sides of said brush and joining together in the interior thereof, and mean for attaching said brush to said body, said skirt and cross-members having a plurality of downwardly-projecting, spaced teeth wherein said teeth are comprised of a thermoplastic material having a relatively high co-efficient of friction to adhere to loose hair to be suctioned and sufficient strength for said brush to achieve brushing action, the length of said teeth being in the range 4–10 mm and the ratio between the area of said teeth and the area of the spacing between said teeth being the range 1:1 to 1:2.

6. A vacuum cleaner accessory according to claim 5 wherein said teeth are molded of an elastomer-based rubber having a durometer reading between Shore A47 and Shore D63.

7. A vacuum cleaner accessory according to claim 6 wherein the shape of said teeth is triangular and four-sided, the depth and width thereof being the same.

8. A vacuum cleaner accessory according to claim 7 wherein said teeth are 6 mm long and said ratio is 1:1.

* * * * *